Figure 1:
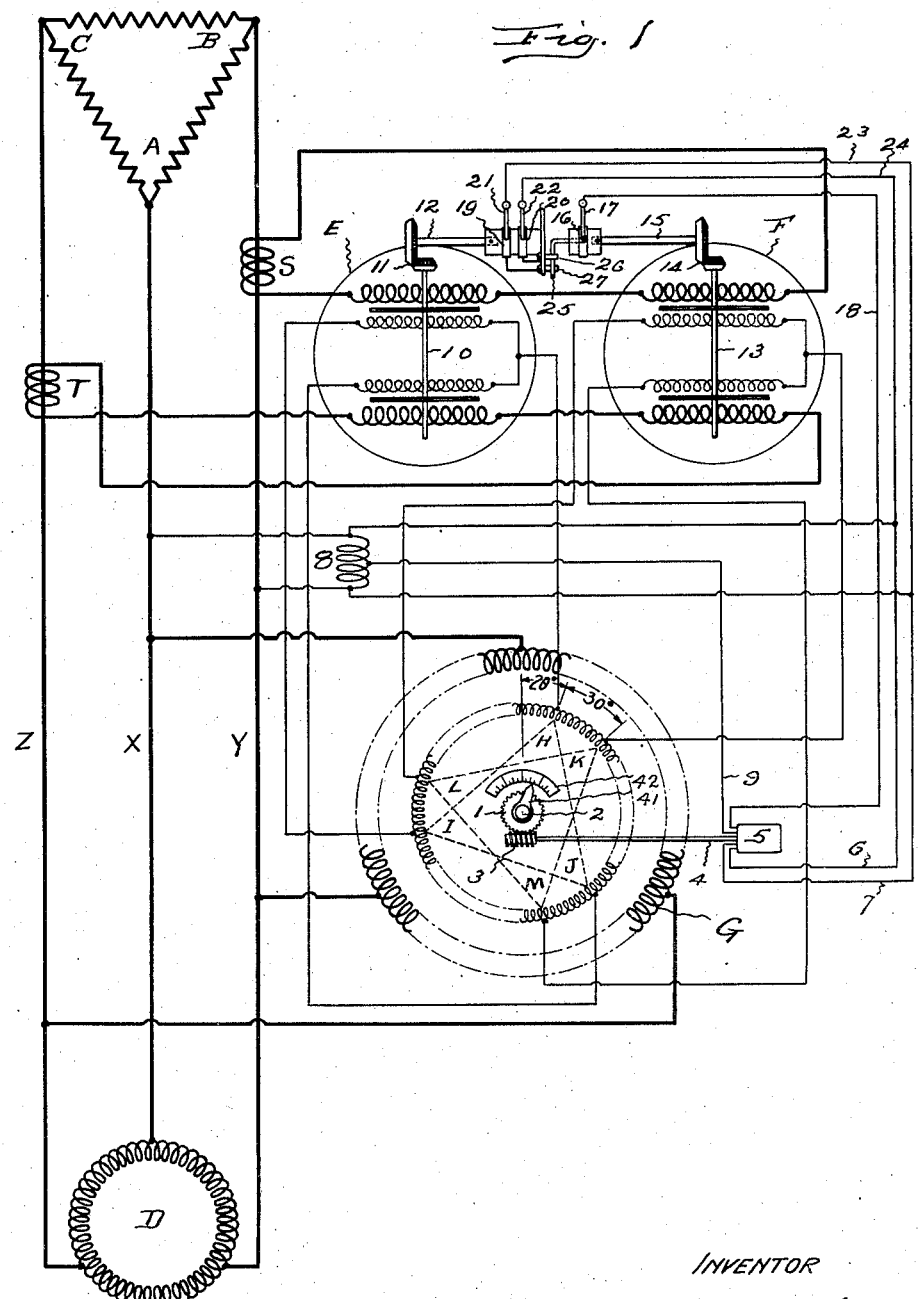

Jan. 10, 1928.

H. J. BLAKESLEE 1,655,492

KILOVOLT AMPERE DEMAND METER

Filed Feb. 9, 1924

4 Sheets-Sheet 1

INVENTOR

Henry J. Blakeslee
by
Harry R. Williams
att.

Jan. 10, 1928.
H. J. BLAKESLEE
KILOVOLT AMPERE DEMAND METER
Filed Feb. 9, 1924     4 Sheets-Sheet 2
1,655,492
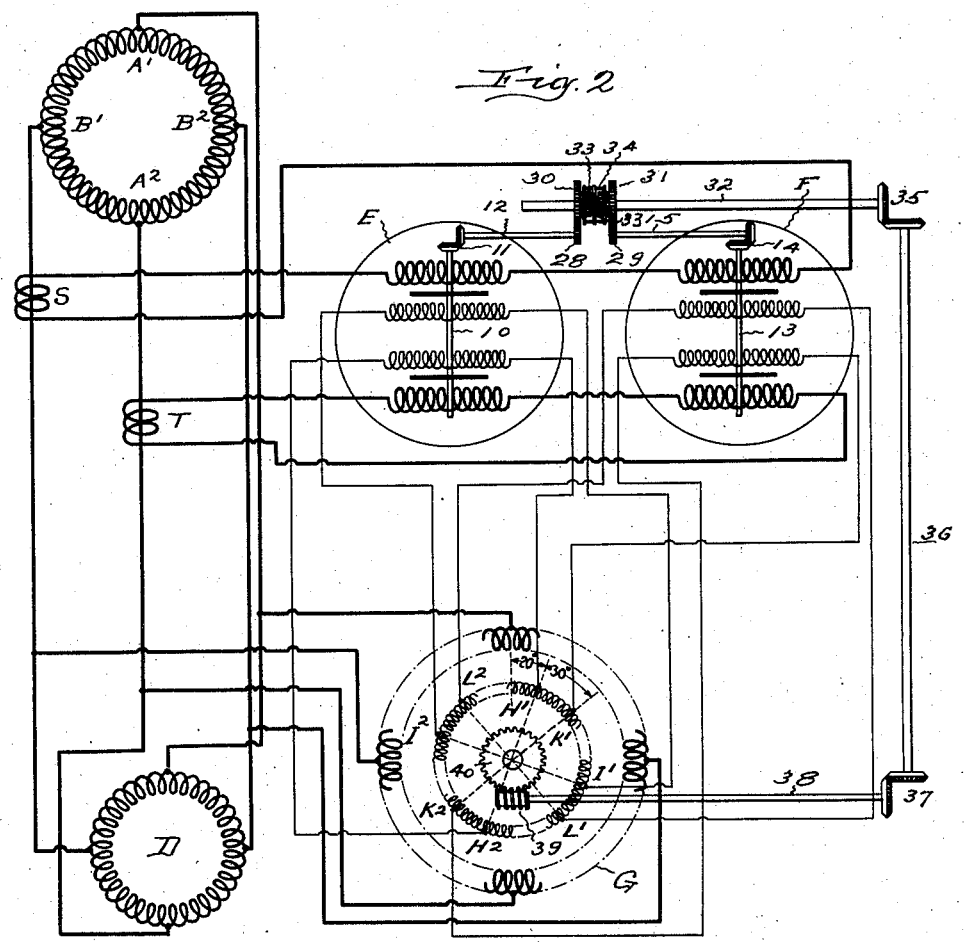
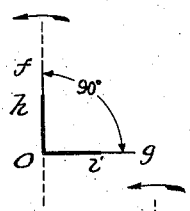
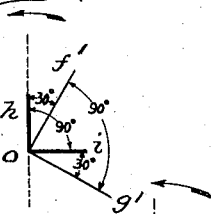
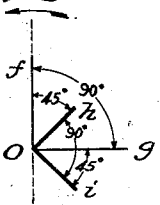
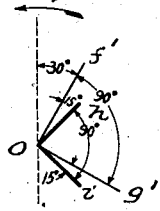
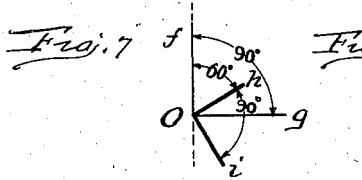
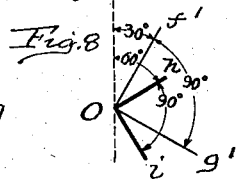
INVENTOR Jan. 10, 1928.

H. J. BLAKESLEE

KILOVOLT AMPERE DEMAND METER

Filed Feb. 9, 1924  4 Sheets-Sheet 3

1,655,492

INVENTOR
Henry J. Blakeslee
Harry P. Williams
atty.

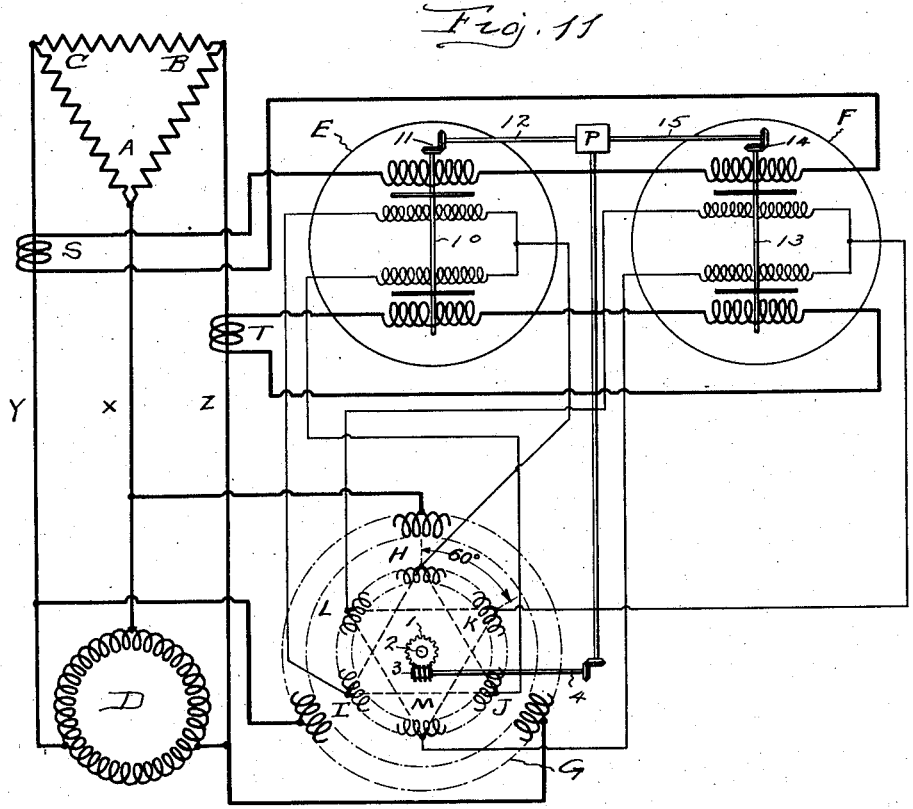

Patented Jan. 10, 1928.

1,655,492

UNITED STATES PATENT OFFICE.

HENRY J. BLAKESLEE, OF WEST HARTFORD, CONNECTICUT.

KILOVOLT-AMPERE DEMAND METER.

Application filed February 9, 1924. Serial No. 691,649.

This invention relates to a demand meter. Previously it has been common to measure the demand of an electric power consumer in kilowatts. It is now recognized that a more equitable unit for representing an electric power consumer's share of the investment costs of a power system or his demand for equipment to serve him, is the kilovolt-ampere.
The object of the present invention is to provide a relatively simple, cheap and satisfactory operating instrument which will measure the demand of a consumer for polyphase current, in kilovolt-ampere units.
In a balanced polyphase circuit of unity power factor a watt meter measures true watts, and this measurement is also true volt amperes, the two quantities being, under these conditions, identical. When the power factor of the circuit is less than unity, as will be the case if the current lags due to an inductive load, or leads due to condensive load, the watt meter will not measure volt amperes. If, however, the electro-motive forces supplied to the watt meter be altered in phase by an angle equal to the lag or lead of the currents, the watt meter will measure volt amperes, although it will not now measure watts, therefore by continually changing the phase of the electro-motive forces as the phase of the currents change the meter will constantly measure volt amperes. When properly connected and manipulated a phase shifter will serve the purpose above mentioned, and by making the operation of the phase shifter automatically responsive to the power factor of the circuit, or in other words to the changes in phase of the currents, the arrangement becomes under all conditions of power factor a volt ampere meter.

The object of the invention is attained by combining a meter of the type commonly used for measuring power in a polyphase circuit and having current windings energized by the current flow in the power circuit; a phase shifter that has its primary connected with the power circuit and its secondary connected to the potential windings of the meter; and a controlling mechanism having one or more current coils connected with the meter current coils and one or more potential coils connected with the secondary of the phase shifter, whereby the controlling mechanism will be responsive to the power factor of the circuit in which the meter is connected, that is, means for automatically changing the relations of the phase shifter coils so that the phases of the electro-motive forces supplied to the potential windings of the meter will be displaced from their normal phases at unity power factor, by angles bearing a definite relation to the phase displacements of the currents in the current windings. These co-operating means automatically maintain the electro-motive forces impressed upon the potential windings of the meter connected in the power circuit, at a time phase displacement from the circuit electro-motive forces, substantially equal to the time phase displacement of the currents in such power circuit from their phase at unity power factor of the circuit.

The accompanying drawings represent diagrammatically various arrangements and connections of the elements which will function according to this invention.

Figure 9:
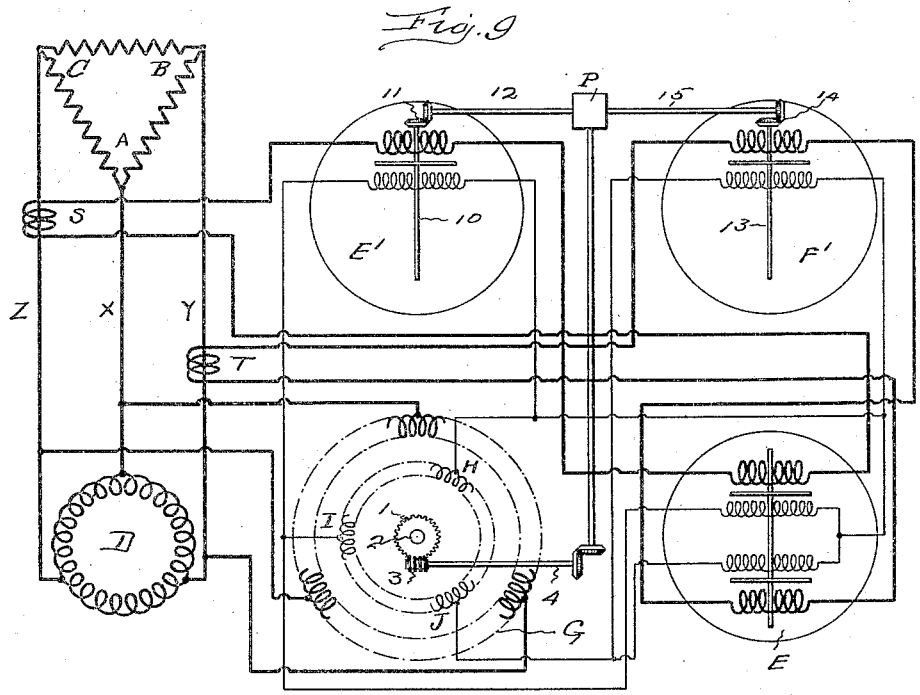
Figure 10:
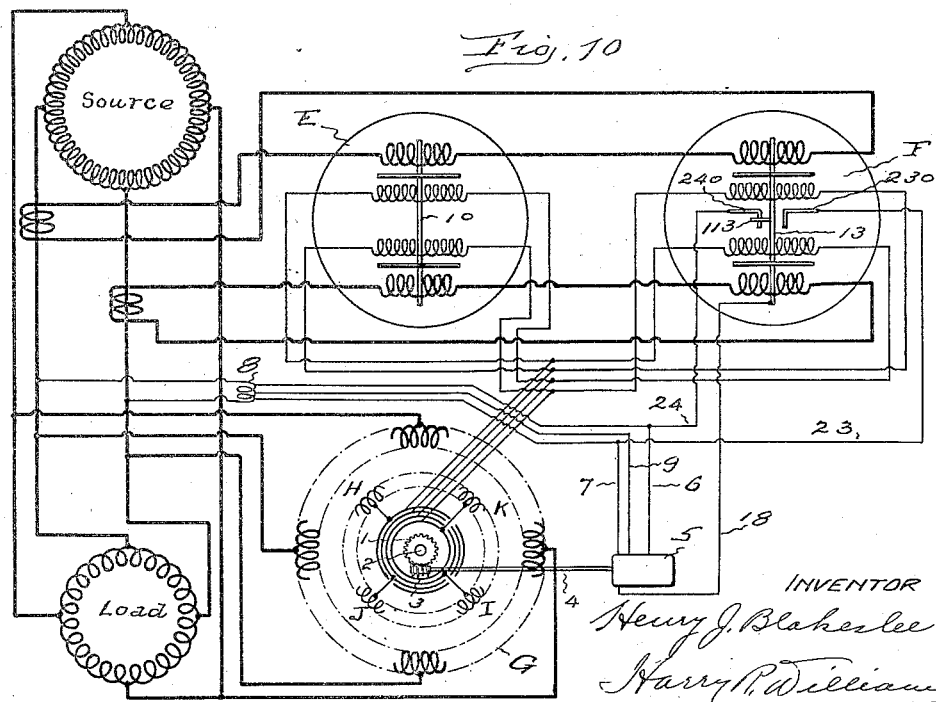

Fig. 1 is a diagrammatic representation of a three-phase power circuit, two, three-phase induction-motor type instruments and a phase shifter, with a reversing motor for actuating the phase shifter. Fig. 2 is a similar view of a two-phase arrangement with the phase shifter mechanically actuated according to the different phase conditions in the controlling instruments. Figs. 3 to 8, inclusive, are vector diagrams of certain two-phase conditions illustrating the actions of the instruments. Fig. 9 is a diagrammatic representation of a modified arrangement in which the controlling is effected by two single-phase instruments, and the secondary of the phase shifter has but one set of polyphase electromotive forces. Fig. 10 illustrates another two phase modification, with a reversing motor for actuating the phase shifter, and a different current altering means for causing change in the direction of rotation of the motor. Fig. 11 illustrates a three-phase modification in which the meter and controlling instruments are identical and there is a mechanical connection for actuating the phase shifter.

In Fig. 1 A. B. C. indicates a source of three phase current, and D the winding of a polyphase load, the power factor of which is variable, such as an induction motor, connected with the source by the conductors X Y Z. E indicates an instrument constructed on the principle of a watt hour meter having two current windings, two potential windings, rotatable shaft, disks and drag magnets, and with gear train and demand indicating or recording attachment, as is well understood by those familiar with the art. F indicates an instrument of similar construction to E although the demand attachment may be omitted. S and T are current transformers connected respectively with the circuit wires Y and Z and supplying the current coils of the instruments E and F. G is a phase shifter of common construction, having its primary winding connected to the line conductors X Y Z and excited from the polyphase source A. B. C. The secondary of the phase shifter is wound to supply two sets of three phase electro-motive forces H. I. J. and K. L. M., the sets being permanently displaced relatively each to the other in phase by a constant angle. In Fig. 1 this displacement is represented to be 30°, but could be some other angle. The rotor with the secondary of the phase shifter is arranged to be rotated by means of a worm wheel 1 on the rotor shaft 2 which wheel may be driven by a worm 3 on the armature shaft 4 of the motor 5.

The motor 5 is a small reversing motor with its field windings connected by wires 6 and 7 to a transformer 8 which is energized from the power circuit by connection with the wires X and Y, and one end of the armature winding connected by a wire 9 to an intermediate point of the transformer 8. The motor is reversed by a simple mechanism actuated by the relative speeds of the shafts of the instruments E and F. The shaft 10 of the instrument E is connected by gearing 11 with the shaft 12, and the shaft 13 of the instrument F is connected by gearing 14 with shaft 15. On the shaft 15 is a conducting ring 16 bearing on which is a brush 17 that is connected by a wire 18 with the other end of the motor armature winding. On the shaft 12 are two conducting rings 19 and 20 bearing on which are brushes 21 and 22. These brushes are connected by wires 23 and 24 with the transformer 8 which is connected with the power circuit wires X and Y. The ring 16 on the shaft 15 is connected with a conducting pin 25, and the rings 19 and 20 on the shaft 12 are connected respectively to spaced conducting pins 26 and 27. Any change in power factor of the load will cause a change in the relative speeds of the instrument shafts 10 and 13 and this will cause the pin 25 to make contact with either the pin 26 or the pin 27 and complete the motor circuit. The rotation of the motor armature and the rotor of the phase shifter which is driven thereby, will be in one direction if the contact is made with the pin 26 and in the opposite direction if the contact is made with the pin 27. If the two shafts 10 and 13 are rotating at equal speeds the contacts of the reversing mechanism will be disengaged. If one shaft rotates at a different speed from the other the contacts will be engaged and the motor started and the rotor of the phase shifter will be turned in such direction as will alter the phases of the currents in the potential windings of the instruments E and F and this will restore the equality of speed of the shafts 10 and 13 and when the equality is restored the contacts will become disengaged and the motor will stop its action of changing the rotor of the phase shifter.

The instrument F may be so adjusted that the speed of its shaft is the same as the speed of the shaft of instrument E, when connected as shown on a balanced polyphase circuit and with the electro-motive forces H. I. J. displaced from the power circuit electro-motive forces the same amount as the displacement from unity of the currents in the load. It is stated that the electro-motive forces K. L. M. are displaced 30° more than the electro-motive forces H. I. J. and if the two instruments E and F have the same nominal disk constants, then in order to have equality of speed, adjustments of F will be such as to make it run fast approximately 15% (the reciprocal in registration of .866 which is the cosine of 30°). In other words if instruments E and F are alike in other respects then if E is adjusted to a registration of 100%, F will be adjusted to a registration of 115% in order to operate as described. In the diagram the power factor is considered constant with current lag of 20° and H. I. J. displaced 20° from line potential A. B. C.

If now the currents in the load lag more than the electro-motive forces H. I. J. they will come more nearly in phase with K. L. M. and shaft 15 will rotate faster than shaft 12. This will cause the contacts of the reversing mechanism to so engage that the motor will turn the phase shifter rotor to a different position and will continue its rotation until shafts 12 and 15 are again at the same speed, at which position electro-motive forces H. I. J. are again displaced equally with the current displacement, and E measures volt amperes, as it did in the first position.

If the currents in the load, due to change in power factor, lag less than the electro-motive forces H. I. J. then shaft 15 will rotate more slowly than shaft 12 and the contacts so engage that the motor will turn the phase shifter in the opposite direction from that of the previous illustration, until equality of speed is again restored in the two shafts 12 and 15. Whatever the change be in the power factor of the load the relative speeds of the shafts 12 and 15 will always be such as to cause movement of the phase shifter rotor in a direction to restore equality of speed in the shafts and to continue such rotation until equality of speed is restored. When the speeds of shafts 12 and 15 are equal the instrument E measures the volt ampere demand of the load when provided with the demand attachment hereinbefore mentioned.

With a phase displacement between the two sets of electro-motive forces H. I. J. and K. L. M. of 30° the torques of the shafts of E and F are not greatly different and are fairly high, whereas if the sets were displaced by a much greater angle the torque of F would under most conditions be relatively low which is a disadvantage. However should excessive changes in power factor occur so suddenly that the mechanism could not quickly respond the instruments E and F might reverse if H. I. J. and K. L. M. were only 30° displaced, and for such conditions an arrangement having H. I. J. and K. L. M. displaced 60° or more might be adopted even at the disadvantage of the reduced torque in F. For this reason the invention is not limited to the choice of 30° displacement of H. I. J. and K. L. M. but it is, of course, evident that if some other angle of displacement should be used modifications would have to be made in the adjustment of instrument F.

With a slight modification in the construction of the phase shifter the apparatus is adaptable to a two phase circuit, and instead of a relay or motor control for the phase shifter the rotor of the shifter may be actuated mechanically through a differential gearing operated by the difference in the relative movements of the shafts of the instruments E and F.

A two phase arrangement and differential gearing control are shown in Fig. 2. In this form $A^1$ $A^2$ $B^1$ $B^2$ indicate a two phase source supplying current to a load D. The secondary winding of the phase shifter is arranged to supply to the potential coils of the instruments E and F two sets of two phase electro-motive forces $H^1$ $H^2$ $I^1$ $I^2$, and $K^1$ $K^2$ $L^1$ $L^2$, the latter set illustrated as lagging the former set by 30° in phase. In all other respects, allowing for such differences in connections as are apparent to those familiar with the art, the construction and operation of the phase shifter and instruments E and F are the same as in the three phase case previously described.

The differential gearing may be of any usual type. In the arrangement illustrated the shaft 10 of the instrument E is connected by gearing 11 with the shaft 12, and shaft 13 of the instrument F is connected by gearing 14 with a shaft 15, as before. In this case the shaft 12 is provided with a pinion 28, and the shaft 15 is provided with a pinion 29, which pinions mesh respectively with gears 30 and 31 that turn loosely on the shaft 32. These gears have teeth that are engaged by pinions 33 which are mounted upon a frame 34 fastened to the shaft 32. Such a differential is used in a well known electric meter and is understood by those familiar with meter construction.

The shaft 32 through gearing 35 drives a shaft 36 which by gearing 37 drives the shaft 38 which may have a worm 39 meshing with the worm wheel 40 on the shaft of the rotor of the phase shifter. The difference in relative movements of the shafts 10 and 13 of the instruments E and F, through this differential, cause the rotor of the phase shifter to change and stabilize the conditions, and this difference in relative movements of the instrument shafts is effected by the changes in the phase in the current coils of the instruments due to lag or lead of the current in the power circuit, as before described.

Instead of adjusting the instrument F to a registration of 115% as stated, it is possible to adjust it to a registration of 100% and use a gear ratio between the instrument shaft 13 and the shaft 15, which will be different from the ratio of shaft 12 to shaft 10 of instrument E, in order to secure equal speeds of 12 and 15 under stable conditions of load. If the ratio of the gearing in E between shaft 10 and shaft 12 is represented by 100 then the ratio between shaft 15 and shaft 13 in F would be 86.6. If some other angle than 30° were used in the displacement of the sets of electromotive forces furnished by the secondary of the phase shifter, then the gear ratio would be of different value. It is also evident that E and F may be adjusted to have equal speeds under stable power factor conditions by changes in the windings of the coils in F which would change the load speed characteristic of that instrument.

Vector diagrams are shown of certain two phase conditions to illustrate the actions of the instruments which are used in carrying out the invention.

Fig. 3 is a vector diagram showing the phase relations of electro-motive forces and currents in the windings of instrument E at two phase balanced load, unity power factor and with electro-motive forces in the same phase as the power line electro-motive forces. $O.f$ and $O.g$ indicate the electro-motive forces in meter E, and $O.h$ and $O.i$ the currents in meters E and F, the arrow in this and the other diagrams indicating that vectors toward the arrow head lead in phase, vectors toward the tail of the arrow.

Fig. 4 is a diagram of vector showing conditions in instrument F under the same circumstances. $O.f'$ and $O.g'$ indicate the electro-motive forces in meter F.

As the torque of the shaft in either E or F is proportional to the sum of the products of the current and electro-motive force and cosine of phase angle in each element, it is evident that the torque on the shaft of E is greater than the torque on the shaft of F. This explains why the registration of F must be made 115% that of E in order that the shafts 12 and 15 shall have equal speeds, or else the gear ratios be different as stated hereinbefore.

Figs. 5 and 6 show current and voltage relations in E and F respectively if current lags 45°. These are the conditions while the phase shifter is in the same position as in Figs. 3 and 4. It is now evident that the torque on the shaft of F is greater than in the first case and the torque on the shaft of E is less than in the first case.

If the current should lag 60° with the electro-motive forces unchanged from the first case the conditions would be as shown in Figs. 7 and 8. Here it will be noted that the torque on the shaft of F is the same as in Fig. 4 but the torque on the shaft of E is only 50% of what it was in Fig. 3. Thus it is noted that in the cases illustrated each change in current lag has caused changes in the torques of the shafts of E and F which would cause F to increase its speed relatively to E.

Fig. 9 shows a modified arrangement. The secondary of the phase shifter in this case has but one set of poly-phase electro-motive forces H. I. J. and two instruments E′ and F′ which are connected by the differential P, are single phase instead of polyphase, as are instruments E and F in Figs. 1 and 2. Meter E in Fig. 9 is the same as meter E in Figs. 1 and 2. The operation of the arrangement in Fig. 9 is as follows. In a three phase circuit the total watts may be measured by two single phase watt meters, the current of one line conductor passing through the current coil of one watt meter and the current of another line conductor passing through the current coil of the other watt meter, and with the potential coil of each watt meter connected between the line conductor in which the watt meter is connected and the third conductor of the line. When the polyphase load in such a circuit is balanced and of unity power factor the watts equal the volt amperes and also the two meters have equal indications. If the current in the circuits becomes displaced in phase due to change in reactance of the load, and the electro-motive forces of the meters are changed in phase the same way and degree, the meters will again have equal indications and measure volt amperes. The differential P causes motion of the phase shifter rotor when the shafts 12 and 15 have unequal speed, in such direction as to restore equality of speed. Therefore E′ and F′ can be used to indicate volt ampere hours or, with suitable attachments as hereinbefore mentioned, volt amperes or volt ampere demand. As the speeds of F′ and E′ are equal under stable conditions either instrument can be calibrated to give the necessary measurement.

A separate instrument E can be used to give the indications of the quantities mentioned by connecting its current coils in the line and exciting its potential coils from the phase shifter electro-motive forces H. I. J., in this latter case E′ and F′ act merely as controlling means.

Another two phase modification is illustrated in Fig. 10. In this case the potential coils of instrument F are excited from K. J. I. H. so that the electro-motive forces are in each coil displaced 90° to the electro-motive forces applied to the potential coils in E. By this arrangement when the power factor of the load is stable the electro-motive forces in E are displaced in phase from the main line electro-motive forces equally with the current displacement, and E will measure volt amperes. As the electro-motive forces in F under these conditions are displaced 90° from their respective currents, F will indicate zero. If the power factor of the load changes, F moves in such a direction as to cause the phase shifter to rotate in the direction to restore 90° phase displacement of electro-motive forces with respect to currents in F, and restore its zero position, and at the same time phase coincidence in E and therefore correct indication of volt amperes. The movement of the phase shifter rotor is accomplished by a reversing motor 5, worm and worm wheel, as previously described in reference to Fig. 1.

The motor field windings are connected by wires 6 and 7 to a transformer 8 connected to and energized by the power circuit, and one end of the armature winding is connected by a wire 9 to an intermediate point of the transformer. In this case the shaft 13 of instrument F is connected by wire 18 to the other end of the armature winding, and the shaft 13 has a contact 113, that, when conditions are correct, is out of engagement with contacts 230 and 240 which are connected by wires 23 and 24 with the transformer and the motor field windings. Changes in power factor of the load will cause the contact 113 to engage with either contact 230 or 240 and close the circuit in such manner that the motor will turn the rotor of the phase shifter to restore the conditions.

A three phase modification is illustrated in Fig. 11. In this arrangement the parts are the same as in Fig. 1 with the exception that the sets of electro-motive forces H. I. J. and K. L. M. supplied to the potential coils of the instruments E and F by the phase shifter are displaced 60°, which is preferred in this case, but not necessary, and the instruments E and F are identical in calibrating and load speed characteristics and have the same gear ratios between the main shaft and shafts 12 and 15. The differential P and rotor of the phase shifter will in this case, as in Fig. 1, come to rest when the shafts 12 and 15 have equal speeds, and in this case equal speed will occur when the difference in phase displacement between the electro-motive set H. I. J. and the currents in E equal the difference in phase displacement between the electro-motive force K. L. M. and the currents in F. As the currents in E and F are in series and therefore the same this condition will occur when the electro-motive force set H. I. J. is 30° leading the current displacement, and the set K. L. M. is 30° lagging the current displacement. If E and F are adjusted to 100% registration as watt hour meters they will read 86.6% of volt ampere hours or volt ampere demand and will require a reading constant of 1.15. The advantages of this arrangement are that instruments E and F are identical and have the same registration, their torques are high and standard instruments may be used without alteration of their characteristics.

In all the forms of the apparatus described and illustrated the position of the rotor of the phase shifter is an indication of the power factor of the circuit or of the load D. Therefore by attaching a pointer 41 to the rotor shaft and arranging a suitable scale 42 the apparatus becomes in effect a power factor meter.

In all of the arrangements shown the phase shifter is controlled by the behavior of instruments which take their electromotive forces from the phase shifter and their current from the polyphase circuit to which the instruments and the phase shifter are connected. This interaction of instruments and phase shifter is not only adapted, as set forth, to a volt-ampere meter, a volt-ampere hour meter, a volt-ampere demand meter, and a power factor meter, but also to other measuring instruments, without departing from the invention.

I claim as my invention:

1. An electrical measuring apparatus for a polyphase electric power circuit, comprising an induction-motor type of instrument having a free rotating element actuated from the current and potential coils thereof, an induction-motor type of controlling instrument having a free rotating element actuated from the current and potential coils thereof, a phase shifter having primary and secondary coils, means for connecting the current coils of said instruments and the primary coils of said phase shifter to the power circuit, conductors connecting the potential coils of said instruments with the secondary coils of said phase shifter in different angular relations, and means actuated by the resultant of the actions of said instruments for changing the angular relations of the primary and secondary coils of said phase shifter, whereby changes in phase of the current in the polyphase power circuit to which the apparatus is connected will cause a responsive change in the phase shifter and relative speeds of the rotary elements of said instruments.

2. An electrical measuring apparatus for a polyphase electric power circuit, comprising two similar induction-motor type instruments each having current and potential coils and a free rotating element actuated therefrom, a phase shifter having primary and secondary coils, means for connecting the current coils of said instruments and the primary coils of said phase shifter to the power circuit, conductors connecting the potential coils of said instruments with the secondary coils of said phase shifter in different angular relations, and means actuated by the resultant of the actions of said instruments for changing the angular relations of the primary and secondary coils of said phase shifter, whereby changes in phase of the current in the polyphase power circuit to which the apparatus is connected will cause a responsive change in the phase shifter and relative speeds of the rotary elements of said instruments.

3. An electrical measuring apparatus for a polyphase electric power circuit, comprising an induction-motor type of instrument having a free rotating element actuated from the current and potential coils thereof, an induction-motor type of controlling instrument having a free rotating element actuated from the current and potential coils thereof, a phase shifter having rotatably variable primary and secondary coils, means for connecting the current coils of said instruments and the primary coils of said phase shifter to the power circuit, conductors connecting the potential coils of said instruments with the secondary coils of said phase shifter in different angular relations, reversible mechanism for changing the angular relations of the primary and secondary coils of said phase shifter, and means actuated by the resultant action of said instruments for actuating said reversible mechanism in either direction, whereby changes in phase of the current in the polyphase power circuit to which the apparatus is connected will cause a responsive change in the phase shifter and relative speeds of the rotary elements of said instruments.

4. An electrical measuring apparatus for a polyphase electric power circuit, comprising an induction-motor type of instrument having current and potential coils and a free rotating element actuated therefrom, a controlling instrument of the induction-motor type having current and potential coils and a free rotating element actuated therefrom, a phase shifter having primary and secondary coils, means for connecting the current coils of said instruments and the primary coils of said phase shifter to the power circuit, conductors connecting the potential coils of said instruments with the secondary coils of said phase shifter in different angular relations, a reversible motor connected to change the angular relations of the primary and secondary coils of said phase shifter, contacts adapted to be engaged by difference in speeds of the rotating elements of said instruments, and conductors connecting said contacts with said motor and adapted to be connected in the power circuit, whereby changes in phase of the current in the polyphase power circuit to which the apparatus is connected will cause a responsive change in the phase shifter and relative speeds of the rotary elements of said instruments.

5. An electrical measuring apparatus for a polyphase electric power circuit, comprising an induction motor type of instrument having a free rotating element actuated from the current and potential coils thereof, an induction motor type of controlling instrument having a free rotating element actuated from the current and potential coils thereof, a phase shifter having primary and secondary coils, means for connecting the current coils of said instruments and the primary coils of said phase shifter to the power circuit, conductors connecting the potential coils of said instrument with the secondary coils of said phase shifter in different angular relations, means actuated by the resultant of the actions of said instruments for changing the angular relations of the primary and secondary coils of said phase shifter, and means for indicating the angular relation of the primary and secondary coils of said phase shifter, whereby changes in phase of the current in the polyphase power circuit to which the apparatus is connected will cause a responsive change in the phase shifter and instruments, and said changes will be indicated.

6. An electircal measuring apparatus for a polyphase electric power circuit, comprising a metering instrument having current and potential coils and a shaft rotated by the action of the currents in said coils, a controlling instrument having current and potential coils and a shaft rotated by the action of current in said coils, a phase shifter having primary and secondary coils, means for connecting the current coils of said instruments and the primary coils of said phase shifter to the power circuit, conductors connecting the potential coils of said instruments with the secondary coils of said phase shifter in different angular relations, and reversible means controlled by the difference in rotations of the shafts of said instruments for changing the angular relations of the primary and secondary coils of said phase shifter, whereby changes in phase of the current in the polyphase power circuit to which the apparatus is connected will cause a responsive change in the phase shifter.

7. An electrical measuring apparatus for a polyphase electric power circuit, comprising an induction-motor type of metering instrument having current and potential coils, an induction-motor type of controlling instrument having current and potential coils, means for connecting the current coils of said instruments to the power circuit, phase controlling means adapted to be connected with the power circuit and connected to the potential coils of said instruments in different angular relations, and means actuated by the resultant of the actions of the current in said instruments for automatically changing the angular relations of the phases of the current in the phase controlling means, whereby changes in phase of the current in the polyphase power circuit to which the apparatus is connected will cause a responsive change in the current phases in the instruments.

8. An electrical measuring apparatus for a polyphase electric power circuit, comprising a plurality of induction-motor type instruments, each instrument having a current coil, a potential coil and a rotatable element actuated therefrom, a phase shifter having primary and secondary coils, means for connecting the current coils of said instruments and the primary coils of said phase shifter to the power circuit, conductors connecting the potential coils of said instruments with the secondary coils of said phase shifter in different angular relations, and means actuated by the resultant of the actions of said current and potential coils on said rotatable elements for changing the angular relations of the primary and secondary coils of said phase shifter, whereby changes in the phase of the current in the polyphase power circuit to which the apparatus is connected will cause a responsive change in the phase shifter and relative speeds of the rotatable elements of said instruments.

9. An electrical measuring apparatus for a polyphase electric power circuit, comprising a plurality of induction-motor type instruments, each instrument having a current coil, a potential coil and a rotatable element actuated therefrom, means for connecting the current coils of said instruments to the power circuit, phase controlling means adapted to be connected with the power circuit and connected in different angular relations to the potential coils of said instruments, and means controlled by the relative speeds of the rotatable elements of said instruments for automatically changing the angular relations of the phases of the current in the phase controlling means, whereby changes in phase of the current in the polyphase power circuit to which the apparatus is connected will cause a responsive change in the current phases in the potential coils of the instruments.

10. Means for effecting changes in phase shift of polyphase electro-motive forces equal to changes in phase shift of the currents in a polyphase circuit to which said means are connected, comprising a phase shifter connected to said circuit and arranged to furnish polyphase electro-motive forces changeable in phase, a polyphase rotary induction-motor type instrument having current windings connected in the polyphase circuit and having potential windings excited by the polyphase electro-motive forces of the phase shifter, said instrument being provided with a plurality of independently rotatable rotors subject to the effect of the current in said current and potential windings, and reversible means connected with and responsive to the relative speeds of said rotors for automatically altering the position of the movable member of the phase shifter with changes in the phase of the current in the polyphase circuit.

HENRY J. BLAKESLEE.